United States Patent [19]

Paavonen et al.

[11] Patent Number: 5,678,192
[45] Date of Patent: Oct. 14, 1997

[54] RADIO SYSTEM

[75] Inventors: Tapio Paavonen, Saarijärvi; Taavi Yli-Kotila, Äänekoski, both of Finland

[73] Assignee: Nokia Telecommunications Oy, Espoo, Finland

[21] Appl. No.: 446,636
[22] PCT Filed: Nov. 26, 1993
[86] PCT No.: PCT/FI93/00501
 § 371 Date: May 25, 1995
 § 102(e) Date: May 25, 1995
[87] PCT Pub. No.: WO94/13089
 PCT Pub. Date: Jun. 9, 1994

[30] Foreign Application Priority Data

Nov. 27, 1992 [FI] Finland ................... 925431

[51] Int. Cl.⁶ .................................. H04B 7/26
[52] U.S. Cl. ................... 455/38.3; 455/54.1; 455/70
[58] Field of Search ................... 455/38.3, 54.1, 455/54.2, 70, 343, 33.2, 56.1, 67.1; 370/79, 95.1, 95.3, 110.1, 465, 468; 379/60

[56] References Cited

U.S. PATENT DOCUMENTS

| 4,794,649 | 12/1988 | Fujiwara | 455/343 |
| 5,146,214 | 9/1992 | Yamada et al. | |
| 5,150,361 | 9/1992 | Wieczorek et al. | |
| 5,257,406 | 10/1993 | Ito | 455/33.2 |
| 5,517,679 | 5/1996 | Yahagi | 455/38.3 |

FOREIGN PATENT DOCUMENTS

| 245024 | 11/1987 | European Pat. Off. |
| 315260 | 5/1989 | European Pat. Off. |
| 473465 | 3/1992 | European Pat. Off. |
| 2250892 | 6/1992 | United Kingdom |

*Primary Examiner*—Chi H. Pham
*Attorney, Agent, or Firm*—Cushman Darby & Cushman Intellectual Property Group of Pillsbury Madison & Sutro

[57] ABSTRACT

A radio system, including a fixed radio network having base stations and mobile radio stations. Each mobile station with no ongoing call normally monitors messages transmitted by a base station on a control channel in order to enable a fast call set-up. The user may select for a mobile station a normal operating mode, in which messages on the control channel are monitored continuously, as well as an alternative operating mode, in which the mobile station may stop monitoring the control channel at suitable moments for a time of absence known by the radio network, during which time the radio network does not try to send messages to the mobile station.

14 Claims, 2 Drawing Sheets

RADIO SYSTEM

BACKGROUND OF THE INVENTION

The invention relates to a radio system, comprising a fixed radio network having base stations and mobile radio stations, each mobile station with no ongoing call normally monitoring messages transmitted by a base station on a control channel in order to enable a fast call set-up.

Subscriber units used in mobile telephone systems are often hand-portable battery-powered telephones. Because the intention is to make portable subscriber units as small-sized and light as possible, very contradictory demands are made on the batteries to be used in them, viz. small size and as long operation time as possible by one charge. To achieve these properties, a portable subscriber unit is usually implemented by means of a technology consuming as little energy as possible, and the purpose is to minimize unnecessary power consumption in different ways. It is difficult to reduce the power consumption during a call. Also in an idle state, a subscriber unit without an ongoing call monitors the control channel of its base station for possible incoming messages, which implies that at least a receiver, a corresponding synthesizer circuitry as well as a control logic are in operation. It is not directly possible to entirely switch off the subscriber unit between calls, because possible messages from the fixed network may then be lost. For this reason, some cellular radio networks, such as NMT900 and GSM, use continuously a specific sleeping facility for energy saving, by means of which facility the system informs the subscriber unit by signalling on a control channel how long it may "sleep" safely, i.e. be in a state consuming little energy (with the receiver and the synthesizer switched off, for instance), without losing messages. The subscriber unit contains a timer function, which "awakens" the subscriber unit after a predetermined time. The system again attends to that the messages which have come to the subscriber unit during "sleeping" are not transmitted until the subscriber unit is "awake". However, the sleeping facility as per described above is problematic, if a fast call set-up time is required in the system simultaneously. Such systems are, e.g., private trunking radio networks used for transmitting commands, etc., from one subscriber to another. A call may come at any moment, and therefore, the subscriber unit has to be always "awake", so that a command may be passed through immediately. The wake-up facility as described above, in which the system controls the subscriber unit "to sleep", might delay a call set-up even by tens of seconds, which is not always acceptable for all users. For this reason, such a sleeping facility has not been applied to systems requiring fast call set-up, even though a reduction of power consumption of hand-portable subscriber units would be very desirable also in these systems.

U.S. Pat. No. 5,150,361 discloses a TDMA or TDMA/FDMA device having two operating modes: energy saving mode and normal operating mode. In the system described in the prior art document, time frames are transmitted, each of them comprising at least two control time slots. In the energy saving mode, all main parts of the device are shut down during the entire frame, except for one control time slot. In the normal operating mode, the device monitors both control time slots of each frame. In the example presented in the document, the length of a frame is 180 msec and a frame contains four time slots of 45 msec each. So the device is shut down for 135 msec in each frame and active for 45 msec. The shut down periods are thus very short and depend on the length of the time slot, which means only minor savings in energy.

SUMMARY OF THE INVENTION

An object of the present invention is to provide a radio system, which may implement a fast call set-up as well as a significant reduction in power consumption of a subscriber unit by causing the subscriber unit to "sleep" intermittently.

According to one aspect of the invention, the radio system described in the preamble is characterized in that the user may select for a mobile station a normal operating mode, in which messages on the control channel are monitored continuously, as well as an alternative operating mode, in which the mobile station may stop monitoring the control channel at suitable moments and send an absence message to the radio network each time when leaving the control channel, that absence message informing of the leaving and the time of absence, during which the radio network does not try to send messages to the mobile station.

According to another aspect of the invention, the radio system described in the preamble is characterized in that the user may select for a mobile station a normal operating mode, in which messages on the control channel are monitored continuously, as well as an alternative operating mode, upon selection of which the mobile station (MS) informs the radio network and in which the mobile station may stop monitoring the control channel at suitable moments during the absence periods known by the radio network, the starting moments of which periods are determined by the radio network and during which periods the radio network does not try to send messages to the mobile station.

In order to make two important and mutually contradictory properties, i.e. fast call set-up and sleeping facility, compatible in the radio system according to the invention, it is taken into account that the user of a mobile station can select a normal operating mode providing the fast call set-up, and a power saving mode, in which parts of the subscriber unit consuming much energy may be switched off intermittently. The user is able to select the operating mode suitable for his or her subscriber unit at each moment depending on whether he or she desires the fastest possible call set-up or to save the batteries of the device.

In one embodiment of the invention, a subscriber unit in the power saving mode sends a message to the radio network each time when leaving the control channel. The message informs of the leaving and the time of absence. Upon receiving such a message, the radio network interrupts the sending of messages to the subscriber unit for the sleeping time indicated in the message. The messages possibly arriving during this time are stored and transmitted to the subscriber unit after it has awakened.

In another embodiment of the invention, a mobile station informs the radio network of the new operating mode immediately when the user has changed the operating mode. The radio network controls the moments at which the subscriber unit in the power saving mode leaves the control channel and determines the time of absence.

Alternatively, the subscriber unit may use the time during which it is absent from the control channel and thus unreachable for the system also for something else than battery saving. For instance, the subscriber unit may make measurements on adjacent control channels/base stations in order to search for the best base station and have it ready, if it is necessary to change the control channel as a consequence of roaming. The subscriber unit may also use the time of absence for establishing a radio connection with another radio system or for a direct radio communication with another subscriber unit without a radio system.

BRIEF DESCRIPTION OF THE DRAWINGS

In the following, the invention is described by means of embodiments with reference to the attached drawings, in which.

DETAILED DESCRIPTION

Figure 1:
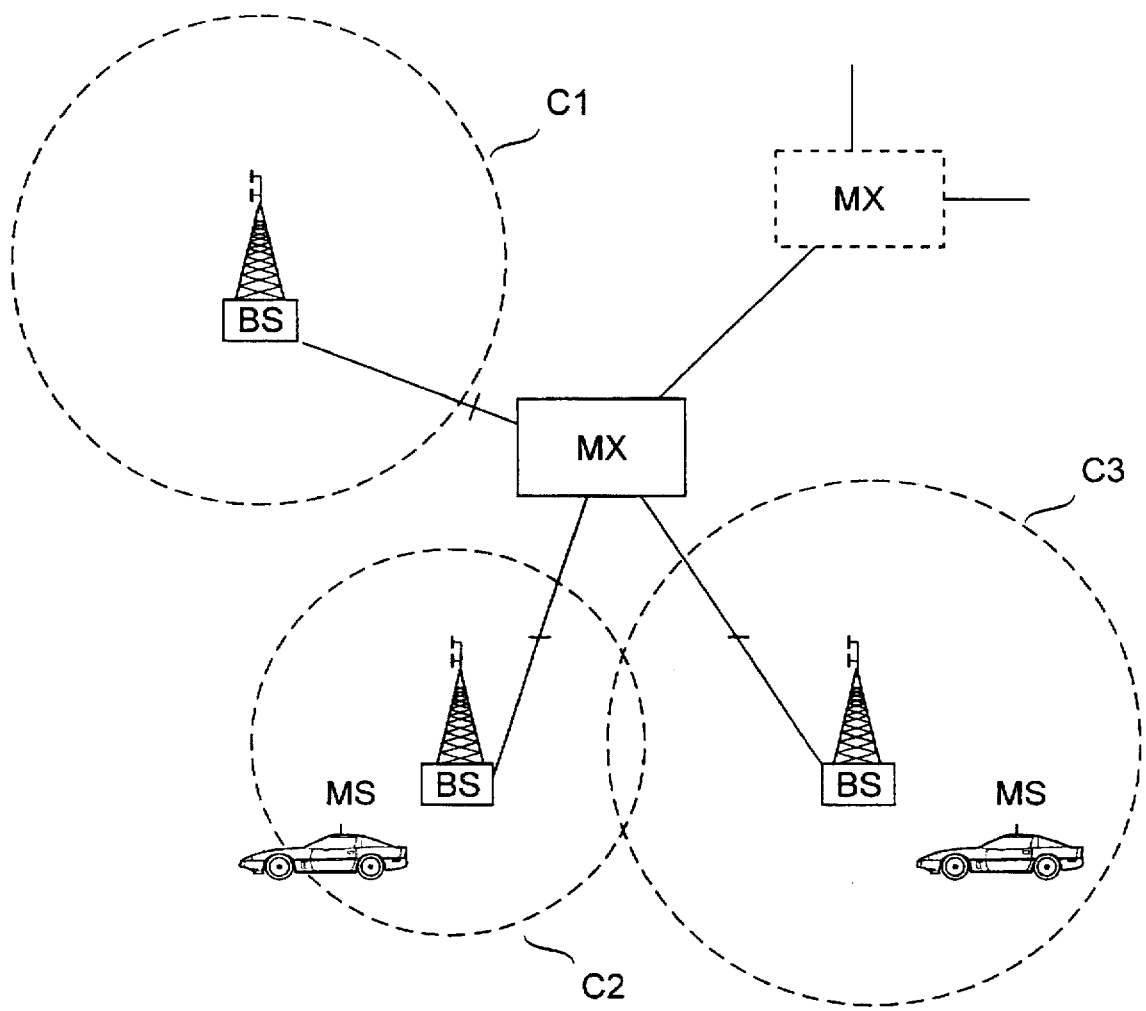
FIG. 1 illustrates a radio system, to which the invention may be applied.

FIG. 1 shows a trunking-type radio telephone system, in which the geographical area covered by the system is divided into smaller radio areas, i.e. radio cells, C1, C2 and C3, being apart from each other, abutting on each other or overlapping each other at edge areas. Each cell C1, C2, C3 comprises at least one fixed, typically multichannel transceiver equipment BS, called a base station. All base stations BS are connected via fixed links, such as cables, to an exchange MX, which controls the operation of the base stations BS. The base stations BS are in radio communication with subscriber radio stations MS moving freely within the area of the system, at radio frequencies, i.e. on radio channels, allocated for the system.

In a trunking-type radio system, several user groups, even several user organisations, share a common group of channels. The trunking radio telephone system may be a digital TDMA system or an analog FDMA system. The structure of the analog FDMA system may be of the type described in Finnish Patent Application 914654, for instance. In the analog FDMA system, each radio channel constitutes one traffic channel or control channel. The term control channel refers generally to a channel or channels on which is or are transferred control signalling of the system between a base station BS and mobile stations MS. The term traffic channel refers generally to a channel for transferring speech or data. In the TDMA system, each radio channel is further divided into time slots (e.g. 4 or 8 time slots per one radio channel), in which the control and traffic channels are conveyed.

Call set-up in such a radio system may be of a message-trunking type, with a traffic channel allocated permanently for one call for the whole duration of the call, or of a transmission-trunking type with a number of simultaneous calls sharing a particular group of traffic channels in such a way that a traffic channel from this group is allocated separately for each call transaction (for each activation of tangent). The present invention is suitable for being used in connection with either way of setting up a call.

Figure 2:
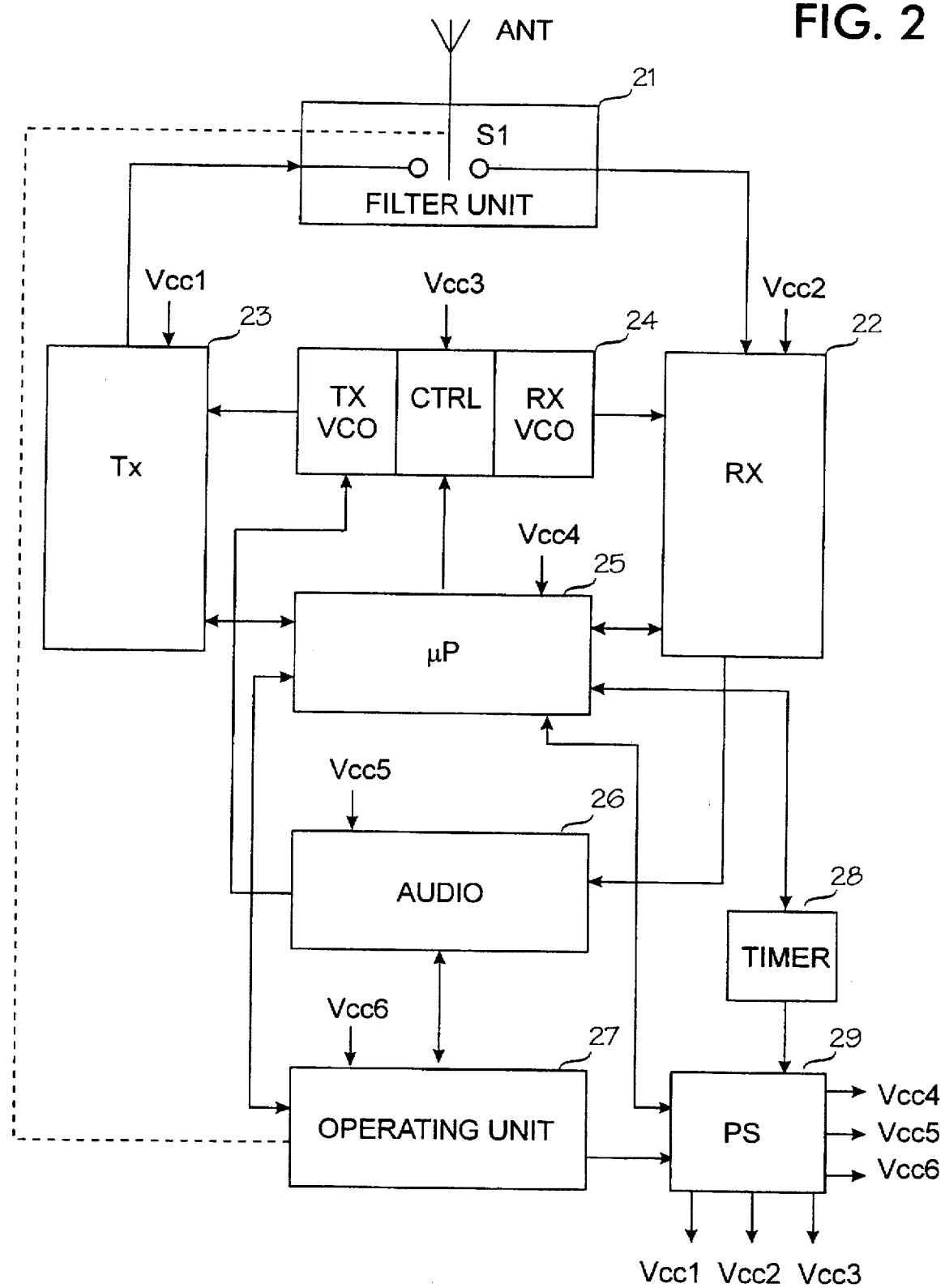
FIG. 2 is a general block diagram of a mobile radio station.

FIG. 2 shows a general block diagram of a mobile radio station MS. The block diagram includes ten functional parts: a control logic 25 (microprocessor), a transmitter 23, a receiver 22, a filter unit 21, a synthesizer 24, an audio part 26, an operating unit 27, a timer 28 and a power source 29. The processor unit attends to all control operations of the radio unit, keyboard and display operations, signal processing, serial traffic and, possibly, generation of ringing tones and DTMF postselections. The audio part 26 processes a low-frequency signal from the receiver 22 and applies it to a loudspeaker or a handset. The audio part also processes an outgoing signal from a microphone and provides it with a correct deviation level before the signal is inputted to an oscillator TXVCO of the synthesizer 24. The synthesizer 24 generates an injection signal for the receiver 22 and a modulated transmission signal for the transmitter 23. The synthesizer comprises three parts, viz. the control logic of the synthesizer and the voltage controlled oscillators RXVCO and TXVCO for the receiver and the transmitter. The function of the receiver 22 is to discriminate and amplify a desired frequency from a signal coming from an antenna ANT and to detect the low-frequency signal. The receiver 22 outputs the low-frequency signal to the audio part 26 and the received signalling messages to the processor unit 25. The function of the transmitter 23 is to amplify the modulated signal from the TXVCO of the synthesizer 24 to a desired transmission power (of a few watts). The oscillator TXVCO of the synthesizer 24 modulates also the signalling messages inputted by the processor unit, which messages are then amplified in the transmitter 23. The filter unit 21 separates the transmitter and receiver frequencies from each other. In addition, the filter unit comprises a transmission switch S1 (tangent), by which the user may manually switch the antenna ANT either to the transmitter 23 or the receiver 22. The operating unit 27 constitutes a user interface between person and machine. The operating unit comprises at least a keyboard and preferably also a numeric or an alphanumeric display. The operating unit may also contain a handset and a microphone.

All above-mentioned parts of the mobile station MS, except the antenna ANT and possibly the filter part 21, are active components and consume electrical power. Operating voltages $V_{cc1}$ to $V_{cc6}$ for different blocks are generated by the power source 29. The power source 29 is controlled by the processor unit 25 and the timer 28 in a manner described below.

The user of the MS may select from the operating unit 27, for instance from the keyboard, at least two different operating modes for the MS, viz. a normal operating mode and at least one alternative operating mode, such as power-saving mode (sleeping mode).

An MS in the normal operating mode, with no call going on, monitors continuously the control channel of a base station (the base station to which the MS is currently registered) and waits for a possible incoming message. Then at least the receiver 22 and the corresponding parts of the synthesizer 24 as well as the audio part 26 and the processor unit 25 are in operation (switched on). The transmitter 23 and possibly also the operating unit 27 are in sleeping state (switched off). The display of the operating unit 27 may be in operation also in the sleeping state.

After the user of the MS has activated the power-saving mode, the processor unit 25 may control the operation of the MS between the control channel-monitoring mode described above and the sleeping mode, consuming very little energy. When the processor unit 25 desires to cause the MS to sleep, it sends information as to the length of the sleeping period to the sleeping timer 28 (and starts the timer at the same time) and commands the power source 29 to switch off the operating voltages of all other circuits, preferably also those of its own. After the determined sleeping period has expired, the sleeping timer 28 causes the power source 29 to switch on the operating voltage $V_{cc4}$ of the processor unit 25, which then commands the power source 29 to switch on the operating voltages of the other necessary circuits. The user may restore the MS from the sleeping mode any time by pressing any key on the operating unit, as a consequence of which the power source 29 switches on the operating voltage $V_{cc4}$ of the processor unit 25, which then causes the operating voltages of the other necessary circuits to be switched on. In the second embodiment of the invention, the processor unit 25 commands the power source 29 to switch off the operating voltages of the other units and employs a lower clock frequency, due to which the power consumption of the processor unit is minimized. As a result, the separate timer 28 may be replaced by a timer inside the processor unit, e.g. by means of software. The processor unit employs the higher clock frequency again after the sleeping period has expired and causes the operating voltages of the other necessary circuits to be switched on.

Because a sleeping MS is not capable of monitoring the control channel of its base station and thus not capable of observing possibly incoming messages, the radio network shall be aware of when and for what time the MS is absent from the control channel.

With the MS in the normal operating mode, in which it continuously monitors the control channel, the call set-up time is typically of the order of 0.5 seconds. If the user does not find fast call set-up time as important as battery saving, the user selects the power saving mode by means of the operating unit, and subsequently, the MS sends to the fixed radio network a message informing that the MS is in the power-saving mode. After this the sleeping periods of the MS will be started from the system by means of a specific starting message. Upon receiving such a starting message and noticing that the message concerns the MS itself, the MS enters the sleeping mode described above for a predetermined time. This predetermined time is preset in the timer 28 and in the data of the radio network. The sleeping time may be selected by the operator, and is at least one second, preferably at least 10 to 20 seconds. An extension of this time prolongs the charging interval of the battery, but also the call set-up time, on the other hand. A suitable time is some compromise between these. The radio network does not send messages to a sleeping mobile station MS during a sleeping period, but stores them and does not transmit them until the MS is awake. A radio network component, typically the exchange MX, controlling the call set-up and transmitting messages, comprises a data file, into which the system registers the mobile stations being in the power-saving mode and requiring messages to be sent for starting the sleeping mode. The same data file also includes a real-time information of whether the MS is asleep or awake, in order that the MX will be able not to send messages during the sleeping period. This last information is not needed in an alternative solution, in which the radio network sends a message immediately upon arrival to the MS and repeats the message after the sleeping period has expired, if the MS has not responded. However, if each MS is caused to sleep from the radio network, it leads easily to an excessive load on the control channel. Therefore it is preferable that the MSs are caused to sleep in groups, one message controlling a plurality of MSs. The division into groups may be based for instance on the last digit (or the last bit or the last two bits) in the paging number, which will be included in sleeping messages.

In the second embodiment of the invention, in which the user has selected the power saving mode, an MX sends an absence message to the radio network each time it leaves the control channel (when being caused to sleep), which message informs of the leaving and the time of absence. Then the radio network stops sending messages to the mobile station for the period informed in the absence message. Such a system causes a high amount of signalling and is therefore suitable for small systems only.

All additional facilities according to the invention required of the radio network may be implemented in a call control computer of the exchange MX, which computer controls call set-up and signalling (e.g. messages) anyway. The previously mentioned data set as well as the timers measuring the sleeping time may be implemented in the memory of the call control computer.

Instead of for battery saving (sleeping), the MS may utilize the time during which it is unreachable for the system also for other measures, which it cannot take during monitoring of the control channel. For instance, the MS may make measurements on adjacent control channels/base stations in order to search for the best base station and have it available, if it is necessary to change the control channel, when the signal of the present base station becomes weaker with the moving MS. The MS may also utilize the absence time for visiting another radio system or for a direct communication with another MS without a system. The first or home radio network does not need to know what the MS is doing during the absence, the only essential information for that network being that the MS cannot be reached during this period. The processor unit 25 of the MS may automatically select, if necessary, the operation which shall be performed during each "sleeping period".

The figures and the description associated with them are only intended to illustrate the present invention. As to the details, the radio system according to the invention may vary within the scope and spirit of the attached claims.

We claim:

1. A radio system, comprising:

a radio network having a plurality of base stations;

a plurality of mobile radio stations each having a user interface allowing a user to select between a normal operating mode and an alternative operating mode for the respective mobile radio station;

each said mobile radio station in said normal operating mode thereof, in case of no ongoing call, being arranged to continuously monitor a control channel of a one of said base stations to which said mobile radio station is currently registered, said one base station thereby then being a serving base station for said mobile radio station;

each said mobile radio station being responsive to selection of said alternative operating mode by the user, for stopping monitoring of said control channel of said serving base station for absence periods decided by said mobile radio station and for monitoring said control channel between said absence periods, and for informing said radio network of beginning and duration of each said absence period by means of an absence message prior to each absence period;

said radio network being responsive to receiving each said absence message for ceasing sending of messages to said mobile radio station on said control channel of said serving base station during each absence period indicated by each absence message.

2. A radio system, comprising:

a radio network having a plurality of base stations;

a plurality of mobile radio stations each having a user interface allowing a user to select between a normal operating mode and an alternative operating mode, for the respective mobile radio station, episodes of operating in said alternative operating mode equating to respective absence periods;

each said mobile radio station in said normal operating mode thereof, in case of no ongoing call, being arranged to continuously monitor a control channel of a one of said base stations to which said mobile radio station is currently registered, said one base station thereby being a serving base station for said mobile radio station;

each said mobile radio station being responsive to selection of said alternative operating mode by the user, for informing said radio network of selection of said alternative operating mode;

said radio network being responsive to selection of said alternative operating mode for said mobile radio station, for commanding said mobile radio station, by commands, to stop monitoring said control channel of said serving base station for said absence periods;

said mobile radio station being responsive to said commands from said radio network for stopping monitoring said control channel of said serving base station for said absence periods and for monitoring said control channel between temporally succeeding ones of said absence periods;

said radio network being arranged to cease sending of messages to said mobile radio station on said control channel of said serving base station during said absence periods.

3. A radio system according to claim 1 or 2, wherein:

said mobile radio station is arranged to measure adjacent base stations during at least some of said absence periods.

4. A system according to claim 1 or 2, wherein:

said mobile radio station is in a power-saving mode during each said absence period.

5. A system according to claim 1 or 2, wherein:

said mobile radio station is arranged to be in a direct radio communication with another mobile radio station or to communicate with another radio system during the absence period.

6. A system according to claim 1 or 2, wherein:

said mobile radio station comprises a control processor controlling operation of said mobile radio station, a transceiver, a synthesizer, an audio unit to process audio signals to be sent and received and wherein all operations of said mobile radio station are continuously switched on in said normal operating mode, and wherein said alternative operating mode is a power-saving mode, in which said control processor is arranged to control at least said transceiver, said synthesizer and said audio unit to be switched on and off for said absence periods.

7. A system according to claim 6, wherein:

said processor means is also switched off for each said absence period; and said mobile radio station comprises a timer for switching on said processor means after each said absence period.

8. A system according to claim 6, wherein:

said processor means operates during each absence period at a lower clock frequency than in said normal operating mode.

9. A system according to claim 1 or 2, wherein:

each said absence period is at least 1 second in duration.

10. A system according to claim 1 or 2, wherein:

each said absence period is at least 10 seconds in duration.

11. A system according to claim 1 or 2, wherein: each said absence period is at least 20 seconds in duration.

12. A system as claimed in claim 1 or 2, wherein:

each said absence period is between 1 and 20 seconds in duration.

13. A mobile radio station for a radio system including a radio network having a plurality of base stations including a serving base station serving said mobile radio station to which said mobile radio station is registered at a given time, said mobile radio station comprising:

a user interface allowing a user to select between a normal operating mode and an alternative operating mode for said mobile radio station; and said mobile radio station in said normal operating mode thereof, in case of no ongoing call, being arranged to continuously monitor a control channel of said serving base station;

said mobile radio station being responsive to selection of said alternative operating mode by the user, for stopping monitoring said control channel of said serving base station for absence periods decided by said mobile radio station and for monitoring said control channel between said absence periods, and for informing said radio network of the absence and a duration of each said absence period by means of an absence message prior to each said absence period, so as to enable said radio network to cease sending of messages to said mobile radio station on said control channel of said serving base station during the respective said absence period indicated by the respective said absence message.

14. A mobile radio station for a radio system including a radio network having a plurality of base stations including a serving base station serving said mobile radio station to which said mobile radio station is registered at a given time, said mobile radio station comprising:

a user interface allowing a user to select between a normal operating mode and an alternative operating mode for said mobile radio station;

said mobile radio station in said normal operating mode thereof, in case of no ongoing call, being arranged to continuously monitor a control channel of serving base station;

said mobile radio station being responsive to selection of said alternative operating mode by the user, for informing said radio network of the selection of said alternative operating mode, so as to authorize said radio network to command said mobile radio station, using commands, to stop monitoring said control channel of said serving base station for absence periods and to cease sending of messages to said mobile radio station on said control channel of said serving base station during said absence period; and said mobile radio station in said alternative operating mode being responsive to said commands from said radio network for stopping monitoring said control channel of said serving base station for said absence periods and for monitoring said control channel between said absence periods.

\* \* \* \* \*